United States Patent [19]
Cupler, II

[11] 3,739,461
[45] June 19, 1973

[54] METHOD OF PRODUCING CLEAN WALLED BORES IN LAMINATES WORKPIECES

[76] Inventor: John A. Cupler, II, 10 Cupler Drive, La Vale Cumberland, Md. 21502

[22] Filed: Aug. 3, 1971

[21] Appl. No.: 168,649

[52] U.S. Cl............ 29/557, 29/558, 29/625, 15/104.09, 15/236, 83/54, 83/187, 134/8
[51] Int. Cl............................................. B23p 13/04
[58] Field of Search............ 29/558, 557, 625, 29/626, 627; 408/22, 30, DIG. 704, DIG. 705, 1; 83/180, 187, 185, 52, 54; 134/8; 15/104.02, 236, 104.09

[56] References Cited
UNITED STATES PATENTS

| 1,148,065 | 7/1915 | Warren | 29/557 |
|---|---|---|---|
| 2,406,938 | 9/1946 | Zehrbach | 408/1 X |
| 3,293,740 | 12/1966 | Enders | 408/1 X |
| 3,368,257 | 2/1968 | Andreasson | 408/705 X |
| 3,370,508 | 2/1968 | Iaia | 29/558 X |
| 3,457,954 | 7/1969 | Nyberg | 29/558 X |
| 3,570,330 | 3/1971 | Cupler | 29/558 X |
| 2,826,942 | 3/1958 | Swanson | 83/184 |
| 3,091,145 | 5/1963 | Manganelli | 83/187 X |
| 3,627,902 | 12/1971 | Meyers et al. | 29/625 X |
| 3,276,106 | 10/1966 | Bester et al. | 29/625 |
| 3,276,927 | 10/1966 | Medford | 156/3 |

Primary Examiner—Charles W. Lanham
Assistant Examiner—V. A. Dipalma
Attorney—Colton & Stone

[57] ABSTRACT

A method of enlarging or reaming a bore in a laminated workpiece which consists of selecting a straight fluted reaming tool whose diameter just exceeds that of the bore to be reamed. The reamer is held against rotation while being axially infed into the bore to, concomitantly, kerf the bore wall with its cutting edges. The reamer is then held against further axial movement and rotated to produce a finished bore which does not exhibit that workpiece smear or migration between adjacent laminae which is characteristic of bores formed in a laminated workpiece by infeeding a rotating tool.

8 Claims, 10 Drawing Figures

INVENTOR
JOHN A. CUPLER, II

BY Colton + Stone

ATTORNEYS.

METHOD OF PRODUCING CLEAN WALLED BORES IN LAMINATES WORKPIECES

BACKGROUND OF THE INVENTION

The conventional infeed of a rotating cutting tool into a workpiece is inevitably accompanied by a "smear" or migration of workpiece material along the bore wall. The extent of such workpiece migration may vary from a virtually imperceptible and functionally irrelevant smear, occurring as an incident of drilling certain hard metals having a high melting point, to an obvious migratory smear in the case of those workpieces characterized by ready cold flow, thermal softening characteristics and/or low melting points at or near drilling temperatures. Exemplary of this latter class of materials are plastics, glass and certain metals such as copper. This smear or migration of workpiece material is, in effect, a displacement or progression of workpiece material along the bore wall from its original in-situ position in the direction of tool infeed. The causes are several. In the case of the first mentioned class of materials where migration is minimal, it may involve nothing more than a thin film adherence to the drill periphery as may be caused by a portion of the removed material being carried and/or comminuted between the drill periphery and the bore wall. The advancing drill thus continually migrates material along the bore wall as an incident of the wiping action between the bore wall and the constantly changing adherent film on the rotating drill.

It is in the formation of bores in the second mentioned class of materials where migration is substantial and which, in many instances, renders the bore so formed unsuitable for its intended purpose that the invention finds its greatest application. More specifically, the invention is particularly directed to the formation of clean walled throughbores in laminated workpieces destined to become circuit boards.

A typical laminated workpiece used in circuit board manufacture may comprise alternate conductive and non-conductive laminae as exemplified by copper and a plastic composite, respectively. Such plastic composite may comprise, as essential ingredients, epoxy and glass with the former being present in a preponderant proportion. The plastic composite is subject to cold flow which is greatly enhanced by the softening effect created by localized heating produced by a drilling operation which may even cause actual melting of the plastic material when drill temperatures run quite high. Under normal drilling conditions, the frictional heat generated by a rotating drill being infed into a laminated workpiece of the type described will create a condition of plastic flow in the plastic laminae which clings to the drill as an adherent film until it is at least partially wiped therefrom by contact with the bore wall as the drill advances. This material which is thus progressed with the drill in its infeeding direction is that which is referred to as migrated material. Much of this migrated material from a plastic lamina is deposited on the next adjacent copper lamina while, to a lesser extent, copper is migrated onto a next adjacent plastic lamina. It is the plastic deposit over the copper ring defined by the bore wall that presents the problem in circuit board manufacture. The purpose in forming the throughbores is to provide a conductive path therealong which is accomplished by the deposition of a thin conductive metal film on the bore wall, such as by electrodeposition. It is apparent that metal cannot be electrodeposited on the non-conductive plastic lamina and the continuity of the bore wall deposition depends upon the ability of the conductive film to deposit on the metal laminae and "bridge" the non-conductive gaps represented by the plastic laminae. It is equally obvious that the presence of migrated plastic over the ring formed in each individual conductive lamina by the throughbores will defeat routine efforts to effect a good deposit on the copper rings. Since these copper rings must be clean in order to accept the conductive plating; the usual procedures following the conventional formation of a throughbore and prior to plating the same have involved a separate cleaning operation to remove the migrated metal from the bore wall, or at least from the copper rings. Acid cleaning and vapor blasting are two methods that have been used. In some cases where material migration is minimal, it has been possible to plate the holes by increasing power plating factors.

SUMMARY OF THE INVENTION

The invention relates to a method of mechanically removing migrated material from a bore wall. A straight fluted reamer is selected whose diameter just exceeds the bore diameter. The reamer is then inserted, without rotation, into the bore. The inserting movement is accompanied by a kerfing of the bore wall which just exceeds the original bore wall diameter. The reamer is then held against axial movement and rotated to enlarge the bore and remove the migrated material leaving a clean bore wall suitable for plating.

In the process which includes an initial formation of the first undersize bore by a conventional drilling operation to be followed by the reaming operation; automatic tool changing equipment which may be used in the practice of the invention is fully illustrated and described in Applicant's U.S. Pat. No. 3,478,419 the disclosure of which patent is herein incorporated by reference.

DESCRIPTION OF THE PREFERRED EMBODIMENTS

Figure 1:
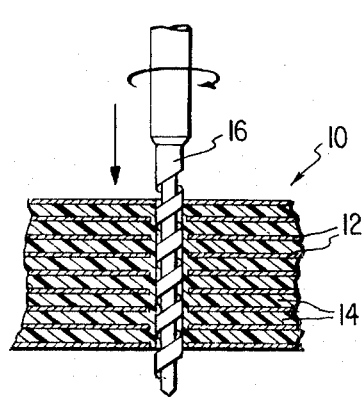
FIG. 1 is a fragmentary section of a laminated workpiece undergoing a conventional drilling operation and wherein the conventional smear or migration of workpiece material is greatly exaggerated for purposes of illustration.
Figure 2:
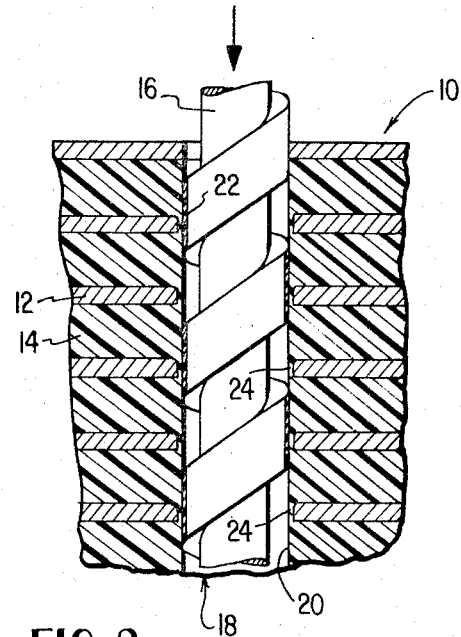
FIG. 2 is a fragmentary enlargement of the workpiece and drill of FIG. 1.

A portion of a laminated workpiece 10 comprised of alternate copper and plastic laminae 12, 14, respectively, is fragmentarily illustrated in FIGS. 1 and 2 as having just been conventionally drilled by a helically fluted drill 16 to form a throughbore 18. The expression "plastic", as used in connection with laminae 14, is used generically to include not only synthetic resin compositions but, also, their common filler materials such as glass and the like.

The bore wall 20 of throughbore 18 is conventionally smeared with that plastic material which is progressed or migrated in the direction of tool infeed from its original in-situ position to an adjacent one or more of the various copper laminae as the rotating drill initially penetrates the first plastic lamina. The natural susceptibility of the plastic material to cold flow plus the development of frictional drilling heat which causes the plastic to flow more readily in the immediate vicinity of the tool causes a thin film adherence of the plastic material to the tool which is carried by the tool to the next adjacent and subsequent copper laminae where a portion thereof is wiped from the tool by engagement between the tool and copper laminae. The thin film adherence of the workpiece material to the tool is indicated by the reference character 22 while the smear of the same along bore wall 20 bears the reference character 24 as is more clearly depicted in the greatly enlarged showing of FIG. 2. The particular smear of plastic material 24 along the bore wall and particularly across copper laminae 22 is greatly exaggerated out of all proportion to the remainder of FIGS. 1 and 2 solely for the purpose of illustration; it being understood that an accurate scale drawing of FIGS. 1 and 2 would show the inner surface of the "rings" formed by the throughbore in each copper lamina to be substantially coincident with the line representation of the bore wall 20. It will be appreciated that the migratory effect is progressive with perhaps a greater proportionate plastic smear at each copper lamina deriving from the immediately preceding plastic layer when considered in the direction of tool infeeding movement. This would appear to be at least partially explainable on the basis that the copper laminae are normally harder than the plastic so that there is a substantially greater wiping effect on the drill as it passes through a copper lamina. Workpiece material from the copper laminae is also migrated along the bore wall though to a much lesser extent than the plastic and it is the migration of the plastic material that will be more fully discussed hereinafter with respect to the specific circuit board workpiece application which has been chosen for purposes of describing the invention.

Upon removal of the tool 16 from bore 18 it is next necessary to clean bore wall 20 to remove the migrated plastic material smear 24 from the inner peripheral surfaces of the various copper "rings" created by the drilling operations so that the same may be plated. This is conventionally done by a separate cleaning operation such as vapor blasting or acid cleaning.

Not only do these prior cleaning operations require a separate set up but the finished bore wall following such operations lack the precision dimensions obtainable with a mechanical machining operation.

The method herein described involves a method of mechanically reaming a previously formed bore to remove migrated material. The reaming operation may be performed on the same set up used in forming the initial bore which, advantageously, employs an automatic tool changer of the type disclosed in U.S. Pat. No. 3,478,419. Such a mechanically reamed hole will, of course, produce a precisely finished bore.

Essentially, the practice of the invention involves a first step of infeeding a rotationally stationary, straight fluted reamer into a previously drilled hole with only the cutting edges thereof making substantial contact with the bore wall and that contact involving only such penetration of the bore wall as to just exceed the depth of migrated material present thereon. The second step involves axially restraining the reamer and rotating the same so that the cutting edges sweep a clean bore wall which bore wall has not been subject to an infeeding movement to migrate material therealong.

Figure 3:
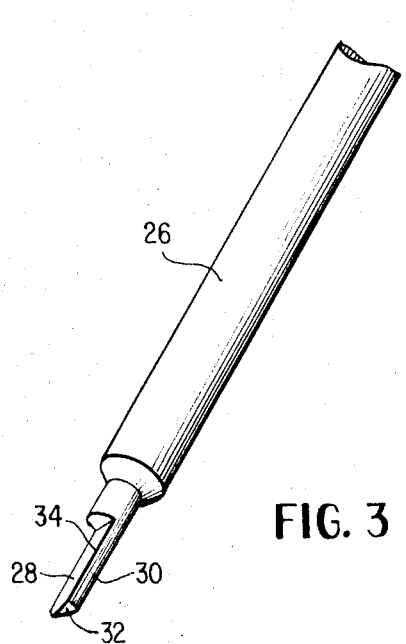
FIG. 3 is a broken perspective view of a single fluted, gun type reamer.
Figure 4:
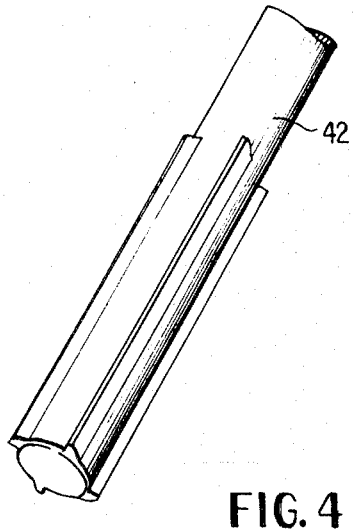
FIG. 4 is a broken perspective view of a multiple fluted reamer.

Although it will be apparent that any straight fluted reamer could be used in the practice of the invention, exemplary reamers illustrating, respectively, a reamer requiring a slightly off center infeed with respect to the initial bore axis and one which is infed coaxial with the initial bore axis are shown in FIGS. 3 and 4.

Figure 5:
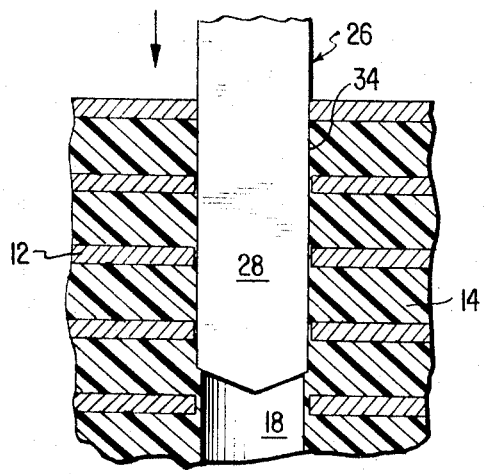
FIG. 5 illustrates the manner of inserting the reamer of FIG. 3 into a conventionally formed bore.

The reamer 26 shown in FIG. 3 is, basically, a gun type reamer having a single flute 28, single semi-cylindrical land 30, a radiused leading end 32 and two straight cutting edges 34. For purposes of the following discussion it will be assumed that the diameter of reamer 26 is equal to that of the desired finished bore and that the conventional bore 18, formed as described in connection with FIGS. 1 and 2, is just slightly undersize with respect to the diameter of reamer 26. Reamer 26 is held against rotation and inserted into bore 18 as indicated in FIG. 5. Due to the fact that reamer 26 has only a single land, the axis 36 thereof is not infed along the original axis 38 of bore 18 but, rather, is just slightly offset therefrom as indicated, in a greatly exaggerated sense, in FIG. 6. The purpose of the slightly offset infeed and the radiused tool end is to avoid shearing the workpiece material as the reamer is inserted in the bore. Since the diameter of reamer 26 just exceeds that of bore 18, the insertion of the reamer results in the formation of kerfs 40 where the cutting edges penetrate the bore wall. It will be understood that the depth of each kerf just exceeds the depth of the migrated material 24 and, in a typical circuit board application, may involve a kerf depth on the order of 0.0002 inch. Although the practice of the invention is independent of the manner in which the reamer is inserted, even if it be held by hand for insertion prior to being chucked for rotation; the manner in which the same may be used in a completely automated manner will be apparent from an inspection of U. S. Pat. No. 3,478,419 which, among other things, discloses apparatus for restraining a non-captive tool against rotation while infeeding the same and wherein such tool is resiliently biased toward its axis of rotation which readily permits the slight off-center infeed above referenced.

Figure 9:
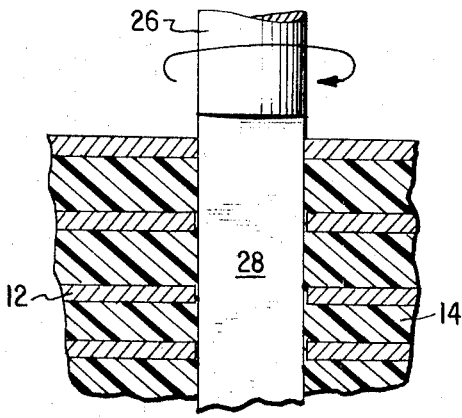
FIG. 9 illustrates the reaming of a bore following insertion of the reamer as in FIG. 5.
Figure 10:
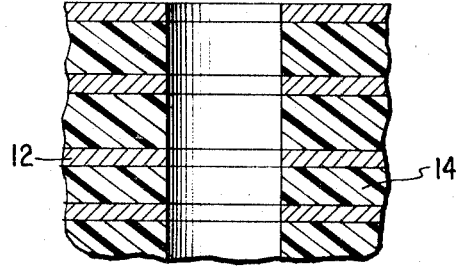
FIG. 10 illustrates the clean walled bore resulting from the reaming operation.

Following insertion of the reamer 26 into bore 18 in any desired manner; the reamer is then restrained against axial movement while the same is rotated as indicated in FIG. 9 to produce a clean bore wall such as shown in FIG. 10. The original bore is thus enlarged and the migrated material removed as reamer 26 is rotated. It will be apparent that the rotational axis 36 of reamer 26 falls into alignment with the axis 38 of the original bore almost immediately upon commencement of rotation as the broad semi-cylindrical land 30 provides a broad bearing surface throughout approximately 180° of the tool periphery. It should be clearly understood that the offset between the initial bore axis and the axis of the reamer is described more for enabling one to picture the manner in which a single fluted reamer will produce the desired result rather than as an actual dimensional offset that need be considered as a practical matter. Actually, the offset is so infinitesimal it would only be recognized in theory. The purpose of the discussion is, therefore, to explain how the land 30, whose radius of curvature is just slightly greater than that of the original bore, can be inserted into the bore.

Figure 6:
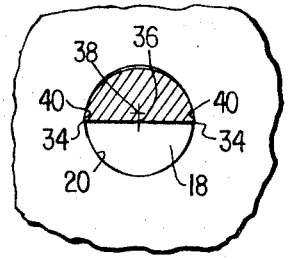
FIG. 6 is a top plan view of FIG. 5.

The explanation will become more clear from an inspection of FIG. 6 showing a top plan view of the original bore with the reamer inserted to produce the opposed kerfs 40 formed by cutting edges 34. As the reamer first starts to rotate, the cutting reaction against the leading cutting edge will cause the tool axis to shift toward the bore axis and the axes will be coincidently captivated by the engagement of the large land 30 with the finished bore wall after the first 180° of tool rotation. Inasmuch as the reamer is not being fed axially, there is no opportunity for workpiece material to be migrated from one lamina to the next.

Figure 7:
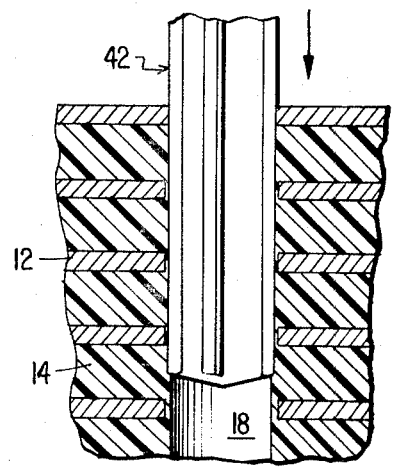
FIG. 7 illustrates the manner of inserting the reamer of FIG. 4 into a conventionally formed bore.
Figure 8:
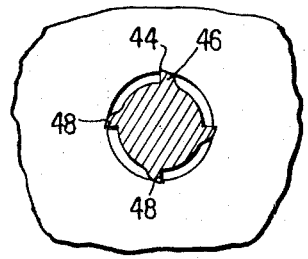
FIG. 8 is a top plan view of FIG. 7.

The method practiced with a multi-fluted reamer, such as the reamer 42 of FIG. 4, is substantially the same as that just described with reference to reamer 26 except that there is no theoretical offset of the reamer and bore axes during insertion. Thus, as shown in FIGS. 7 and 8, reamer 42 is restrained against rotation while the same is inserted into a bore 18. The cutting edges 44 associated with each of the straight lands 46 thus produce four kerfs 48. Thereafter, reamer 42 is rotated to produce a clean walled bore.

The gun type reamer 26 is generally preferred in order to reduce the force required to insert the reamer since it will be apparent that the formation of only two kerfs is less disruptive of the workpiece material, thus requiring a lesser infeed pressure then in the case with the required formation of a greater number of kerfs. Since the finished bore wall of FIG. 10 exhibits no migrated material across the copper laminae, the bore wall is in condition to be plated by conventional techniques without the requirement for additional preparatory steps.

I claim:

1. a method of reaming a bore in a workpiece to remove migrated material from the bore wall thereof, comprising; selecting a reaming tool having a diameter just exceeding the diameter of said bore; restraining said reaming tool against rotation; inserting the rotationally stationary reaming tool in said bore; and rotating said tool to ream said bore.

2. The method of claim 1 wherein the step of inserting the reaming tool includes the simultaneous step of kerfing said bore wall.

3. The method of claim 2 including the step of restraining axial movement of said tool during the rotary reaming operation.

4. The method of claim 3 wherein said workpiece is a laminated workpiece and said bore extends through the laminated workpiece; and wherein the last named step comprises restraining axial movement of said tool with at least one end of said tool extending beyond one surface of said workpiece.

5. The method of claim 4 wherein the step of kerfing said bore wall includes the step of forming at least two straight, parallel kerfs throughout the length of said bore.

6. A method of removing migrated material from a substantially cylindrical throughbore in a laminated workpiece, comprising; selecting a straight fluted reaming tool whose diameter just exceeds that of said throughbore; restraining said tool against rotation; infeeding the rotationally stationary tool parallel to the axis of said throughbore with the reamer blades of said tool in kerfing engagement with the bore wall of said throughbore; terminating the infeed of said tool with said reamer blades engaging the workpiece throughout the length of said throughbore; restraining axial movement of said tool; and rotating said tool to remove said migrated material.

7. a method of forming a finished bore in a workpiece characterized by the absence of migrated material throughout the bore wall surface thereof, comprising; forming a first undersize bore in a workpiece and simultaneously migrating workpiece material along the bore wall thereof; infeeding a rotationally stationary cutting tool parallel to the axis of said undersize bore and simultaneously forming at least one kerf in the workpiece intersecting and extending radially outward of said bore wall and into said migrated material; terminating the infeed of said tool with the cutting edge means thereof in engagement with said at least one kerf throughout the total length thereof; and rotating said cutting tool about said axis to remove said migrated material and enlarge said bore to a finished radius substantially equal to the distance between the radially outermost extent of said kerf and said axis.

8. The method of claim 7 wherein said workpiece is a laminated workpiece; and the formation of said at least one kerf comprises the formation of a plurality of straight kerfs.

* * * * *